(12) United States Patent
Keng et al.

(10) Patent No.: US 12,039,564 B2
(45) Date of Patent: Jul. 16, 2024

(54) METHOD AND SYSTEM FOR GENERATION OF AT LEAST ONE OUTPUT ANALYTIC FOR A PROMOTION

(71) Applicant: Kinaxis Inc., Ottawa (CA)

(72) Inventors: Brian Keng, Toronto (CA); Fan Zhang, Toronto (CA); Kanchana Padmanabhan, Toronto (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/371,366

(22) Filed: Jul. 9, 2021

(65) Prior Publication Data
US 2021/0334844 A1 Oct. 28, 2021

Related U.S. Application Data

(62) Division of application No. 16/496,770, filed as application No. PCT/CA2018/050338 on Mar. 21, 2018.

(60) Provisional application No. 62/475,509, filed on Mar. 23, 2017.

(51) Int. Cl.
*G06Q 30/0242* (2023.01)
*G06F 18/214* (2023.01)
*G06N 5/01* (2023.01)
*G06Q 30/0201* (2023.01)
*G06Q 30/0207* (2023.01)

(52) U.S. Cl.
CPC ....... *G06Q 30/0242* (2013.01); *G06F 18/214* (2023.01); *G06N 5/01* (2023.01); *G06Q 30/0201* (2013.01); *G06Q 30/0223* (2013.01); *G06Q 30/0244* (2013.01)

(58) Field of Classification Search
CPC .......... G06Q 30/0242; G06Q 30/0244; G06Q 30/0201; G06Q 30/0223; G06Q 10/04; G06F 18/214; G06N 5/01
USPC .......................................... 705/14.41, 14.43
See application file for complete search history.

(56) References Cited

U.S. PATENT DOCUMENTS

| | | | |
|---|---|---|---|
| 8,010,404 B1 | 8/2011 | Wu et al. | |
| 8,650,079 B2 | 2/2014 | Fano et al. | |
| 9,367,524 B1 * | 6/2016 | Filev | G06Q 30/0244 |
| 9,454,732 B1 | 9/2016 | Garton et al. | |
| 9,830,304 B1 * | 11/2017 | Simeonov | G06F 40/103 |

(Continued)

OTHER PUBLICATIONS

US 8,706,658 B1, 04/2014, Martinez (withdrawn)
(Continued)

*Primary Examiner* — Alexandru Cirnu
(74) *Attorney, Agent, or Firm* — Borden Ladner Gervais

(57) ABSTRACT

There is provided a method and system for generating an output analytic for a promotion. The method includes determining, using an optimization machine learning model trained or instantiated with an optimization training set, at least one determined parameter for the promotion which optimizes at least one of received input parameters, the optimization training set comprising received historical data; forecasting, using a promotion forecasting machine learning model trained or instantiated with an forecasting training set, at least one output analytic of the promotion, the prediction training set comprising the received historical data, the at least one received input parameter and the at least one determined parameter; and outputting the at least one output analytic to the user.

22 Claims, 10 Drawing Sheets

(56) References Cited

U.S. PATENT DOCUMENTS

| | | |
|---|---|---|
| 2003/0126103 A1 | 7/2003 | Chen et al. |
| 2005/0235201 A1 | 10/2005 | Brown et al. |
| 2006/0103667 A1* | 5/2006 | Amit ............... G06F 40/103 715/788 |
| 2007/0240207 A1 | 10/2007 | Belakhdar et al. |
| 2008/0065463 A1 | 3/2008 | Rosenberg et al. |
| 2010/0049538 A1* | 2/2010 | Frazer ............... G06Q 30/0244 705/14.43 |
| 2010/0218090 A1* | 8/2010 | Amit ............... G06F 40/103 715/247 |
| 2012/0179505 A1 | 7/2012 | McMains et al. |
| 2012/0303410 A1 | 11/2012 | Connors et al. |
| 2013/0036113 A1* | 2/2013 | Damera-Venkata ........................ G06F 40/103 707/E17.014 |
| 2013/0315475 A1 | 11/2013 | Song et al. |
| 2014/0330636 A1 | 11/2014 | Moran et al. |
| 2016/0034928 A1 | 2/2016 | Conway et al. |
| 2016/0335674 A1* | 11/2016 | Plourde ............... G06Q 30/0251 |
| 2017/0169446 A1 | 6/2017 | Li et al. |
| 2017/0214351 A1 | 7/2017 | Lelkes et al. |
| 2018/0174226 A1 | 6/2018 | Yoon |
| 2018/0197428 A1 | 7/2018 | Baphna et al. |
| 2019/0012573 A1 | 1/2019 | Oyamada et al. |
| 2020/0334577 A1 | 10/2020 | Anderson et al. |

OTHER PUBLICATIONS

Rigoglioso, Marguerite, The Surprising Impact of Grocery Circulars, Insights by Stanford Business, dated Aug. 1, 2006, downloaded Jan. 13, 2022 from https://www.gsb.stanford.edu/insights/surprising-impact-grocery-circulars (Year: 2006).*

Google Images screenshot, taken Jul. 5, 2022, displaying images of historic grocery store circulars (Year: 2022).*

Hu, Junling, Reinforcement learning explained, O'Reilly [online], dated Dec. 8, 2016, downloaded from https://www.oreilly.com/radar/reinforcement-learning-explained/ on Aug. 9, 2023 (Year: 2016).*

Carew, Joseph M., Definition reinforcement learning, TechTarget [online], undated, retrieved on Aug. 9, 2023 from https://www.techtarget.com/searchenterpriseai/definition/reinforcement-learning?Offer=abt_pubpro_AI-Insider (Year: 2023).*

Dayan, et al., Reward, Motivation, and Reinforcement Learning, Neuron, vol. 36, pp. 285-298, Oct. 10, 2002, Cell Press, downloaded Aug. 9, 2023 from https://www.cell.com/neuron/pdf/S0896-6273(02)00963-7.pdf (Year: 2002).*

"Business analytics based on financial time series" Kush R. Varshney and Aleksandra Mojsilovic (Year: 2011).*

Andset, Sara, et al., A survey of open source tools for machine learning with big data in the Hadoop ecosystem, Journal of Big Data, 2015, downloaded from https://journalofbigdata.springeropen.com/track/pdf/10.1186/s40537-015-0032-1.pdf on Dec. 21, 2021 (Year: 2015).

Daisy Intelligence, "Daisy's ArtificialIntellignece Series: A four-part series on A.I.'s role in the retial industry", Online Whitepaper, Apr. 30, 2017, http://www.daisyintelligence.com/wp-contentluploads/2017/04/Daisy-A.I.-Series-ePostcard-Speciai-Send.pdf.

Daisy Intelligence, "Machine Learning in Retail", Online Whitepaper, Oct. 20, 2016, http://web.archive.org/web/*/ttp://www.daisyintelligence.com/wp-contentluploads/2015/06/Machine-Learning-Whitepaper.pdf.

Gur Ali et al., "SKU Demand Forecasting in the Presence of Promotions", Expert Systems with Applications: An International Journal, 2009, vol. 36 (10), pp. 12340-12348.

International Patent Application No. PCT/CA2018/050338, International Preliminary Report on Patentability, dated Oct. 3, 2019.

International Search Report for PCT/CA2018/050338; Canadian Intellectual Property Office; dated Jun. 28, 2018.

Keith et al., A Brief History of Machine Learning, dated Mar. 26, 2019, downloaded from https://www.dataversity.net/ a-brief-history-of-machine-learning/# on Apr. 13, 2021 (Year: 2019).

Mishina et al., Boosted Random Forest, Proceedings of the 9th International Conference on Computer Vision Theory and Applications (VISAPP—2014), pp. 595-598, dated 2014, downloaded Jul. 16, 2021 from https://www.scitepress.org/Papers/2014/47390/47390.pdf (Year. 2014).

Statistics How To, Covariate Definition in Statistics, downloaded Jul. 8, 2022 from https://www.statisticshowto.com/covariate/ (Year:2022).

Sunil, Cheatsheet—Python & R codes for common Machine Learning Algorithms, dated Sep. 14, 2015, downloaded from https://www.analyticsvidhya.com/blog/2015/09/full-cheatsheet-machine-learning-algorithms/ on Jul. 15, 2021 (Year: 2015).

Tucker., " Daisy Intelligence: Bringing artificial intelligence to the retail end of the food value chain", Food and Agriculture Businedd Seminar, Arrell Food Institute of the University of Guelph, Jun. 5, 2017.

U.S. Appl. No. 16/496,770, Final Office Action dated Dec. 27, 2021.

U.S. Appl. No. 16/496,770, Non-Final Office Action dated Jul. 22, 2021.

U.S. Appl. No. 17/371,740, Final Office Action dated Jul. 15, 2022.

U.S. Appl. No. 17/371,740, Non-Final Office Action dated Jan. 19, 2022.

Written Opinion for PCT/CA2018/050338; Canadian Intellectual Property Office; dated Jun. 28, 2018.

Hassibi, Khosrow, Machine Learning vs. Traditional Statistics: Different philosophies, Different Approaches, Data Science Central [ online], dated Oct. 28, 2016, retrieved Mar. 10, 2023 from https://www.datasciencecentral.com/Machine-learning-vs-traditional-statistics-different-philosophi-1/ (Year: 2016).

Marr, Bernard, What Is the Difference Between Artificial Intelligence And Machine Learning?, Forbes [online], dated Dec. 6, 2016, retrieved Mar. 10, 2023 from https://www.forbes.com/ (Year: 2016).

U.S. Appl. No. 16/496,770, Non-Final office Action dated Mar. 23, 2023.

U.S. Appl. No. 17/371,740, Non-Final office Action dated Mar. 16, 2023.

U.S. Appl. No. 17/371,740, Advisory Action dated Sep. 16, 2022.

* cited by examiner

METHOD AND SYSTEM FOR GENERATION OF AT LEAST ONE OUTPUT ANALYTIC FOR A PROMOTION

CROSS-REFERENCE TO RELATED APPLICATIONS

This application is a divisional of and claims priority to U.S. patent application Ser. No. 16/496,770, filed Sep. 23, 2019, which is a U.S. National Stage of International Application No. PCT/CA2018/050338, filed Mar. 21, 2018, which claims the benefit of U.S. Provisional Application No. 62/475,509, filed Mar. 23, 2017, all of which are incorporated by reference herein in their entireties.

TECHNICAL FIELD

The following relates generally to marketing materials and more specifically to a method and system for generation of at least one output analytic for a promotion.

BACKGROUND

A common tactic for businesses to gain greater awareness of their products or services, and to attempt to spur positive business results, is to undertake promotions. Promotions can take a number of different forms, such as the generation and distribution of promotional materials, discounts, giveaways, coupons, competitions, or the like. In particular, promotional materials can include, for example, flyers, brochures, leaflets, inserts, admail, or the like. These materials can be in the form of physical hard copies or digital soft copies. In some cases, such as with flyers, the promotional materials can be used to highlight to consumers certain products, such as those products which are on sale or those products which have noteworthy aspects.

Conventionally, in order to create a promotion, personnel of a business or agency would ad-hoc use their best judgement deciding the macro-goal of the promotion and deciding the various aspects of the promotion to achieve such goal. Such an approach is typically time-consuming, inconsistent, and may have to rely on outside help, such as suppliers, who may have different interests. Thus, the conventional approach to promotions is generally not optimized because of its holistic approach and because it is not particularly systematic or statistically selective.

SUMMARY

In an aspect, there is provided a computer-implemented method for generation of at least one output analytic for a promotion, the method comprising: receiving historical data related to one or more products and a plurality of previous promotions; receiving at least one received input parameter for the promotion from a user, at least one of the input parameters comprising a macroscopic objective of the promotion; determining, using an optimization machine learning model trained or instantiated with an optimization training set, at least one determined parameter for the promotion which optimizes at least one of the received input parameters, the optimization training set comprising the received historical data; forecasting, using a promotion forecasting machine learning model trained or instantiated with an forecasting training set, at least one output analytic of the promotion, the prediction training set comprising the received historical data, the at least one received input parameter and the at least one determined parameter; and outputting the at least one output analytic to the user.

In a particular case, the promotion forecasting machine learning model comprises at least one of an average price model and a regression model, the average price model comprises a Random Forest model to predict an average effective discounted price of the promotion based on a category of products, the regression model incorporating covariates to predict demand.

In another case, the regression model is used to determine the discounted price prediction on a per-product basis on a group of products in the same brand or subcategory, or both.

In yet another case, the regression model incorporates indicator variables for the one or more products, determining the indicator variables comprising, for each product, normalizing absolute units by a mean for periods with no promotion, and where such mean is not available, normalizing by the mean of the product's entire history.

In yet another case, the promotion forecasting machine learning model comprises a first Ridge Regression model combined with a second Ridge Regression model, the first Ride Regression model comprising at least one training set feature different than the second Ridge Regression model.

In yet another case, the historical data comprises one or products in a similar category or brand.

In yet another case, the plurality of previous promotions are aggregated in a stacked relationship.

In yet another case, the historical data comprises transaction history for the product and one or more other products in the same product category, the transaction history comprising at least one of date sold, product, units sold, price sold.

In yet another case, the at least one output analytic comprises one of promotion lift, cannibalization, halo effect, pull forward, and price elasticity of demand.

In yet another case, the method further comprising determining a confidence indicator to indicate the reliability of the forecast, determining the confidence indicator comprises: determining if the forecast is in a predetermined scope; and determining, using an accuracy machine learning model trained or instantiated with an accuracy training set, the confidence indicator, the accuracy training set comprising previous forecasts and their respective actualized values.

In another aspect, there is provided a system for generation of at least one output analytic for a promotion, the system comprising one or more processors and a data storage device, the one or more processors configured to execute: an input module to receive historical data related to one or more products and a plurality of previous promotions, the input module further receiving at least one received input parameter for the promotion from a user, at least one of the input parameters comprising a macroscopic objective of the promotion; a machine learning module to build an optimization machine learning model trained or instantiated with an optimization training set and, using the optimization machine learning model, determine at least one determined parameter for the promotion which optimizes at least one of the received input parameters, the optimization training set comprising the received historical data, the machine learning module further building a promotion forecasting machine learning model trained or instantiated with an forecasting training set and, using the promotion forecasting machine learning model, forecasting at least one output analytic of the promotion, the at least one received input parameter and the at least one determined parameter; and an output module to output the at least one output analytic to the user.

In a particular case, the promotion forecasting machine learning model comprises at least one of an average price model and a regression model, the average price model comprises a Random Forest model to predict an average effective discounted price of the promotion based on a category of products, the regression model incorporating covariates to predict demand.

In another case, the regression model is used to determine the discounted price prediction on a per-product basis on a group of products in the same brand or subcategory, or both.

In yet another case, the regression model incorporates indicator variables for the one or more products, the machine learning module determines the indicator variables by, for each product, normalizing absolute units by a mean for periods with no promotion, and where such mean is not available, normalizing by the mean of the product's entire history.

In yet another case, the promotion forecasting machine learning model comprises a first Ridge Regression model combined with a second Ridge Regression model, the first Ride Regression model comprising at least one training set feature different than the second Ridge Regression model.

In yet another case, the one or more processors further configured to execute a confidence module to determine a confidence indicator, the confidence indicator indicates the reliability of the forecast, the confidence module determines the confidence indicator by: determining if the forecast is in a predetermined scope; and determining, using an accuracy machine learning model trained or instantiated with an accuracy training set, the confidence indicator, the accuracy training set comprising previous forecasts and their respective actualized values.

In another aspect, there is provided a computer-implemented method for generation of at least one output analytic for promotional materials, the method comprising: receiving historical data related to one or more products and a plurality of previous promotional materials; receiving one or more input parameters related to the promotional materials from a user; selecting, using a machine learning model trained or instantiated with a selection training set, a configuration and a layout for the one or more products on the promotional materials, the selection training set comprising the historical data and the one or more input parameters, the selection comprising: assigning a prominence weight to each of the one or more products; normalizing the prominence weight for each of the one or more products; determine a block structure for the promotional materials based on the prominence weight of each of the one or more products; and determine a location for each of the products on the promotional materials based on the prominence weight of each of the one or more products; and outputting the promotional materials based on the selection of the configuration and layout.

In a particular case, the method further comprising selecting, using the selection machine learning model, the one or more products to be promoted on the promotional materials.

In another aspect, there is provided a computer-implemented method for generation of at least one output analytic for per-store unit demand, the method comprising: receiving historical data related to one or more products, the historical data comprising historical inventory level of the one or more products at a retail store; forecasting, using a demand machine learning model trained or instantiated with a demand training set, a demand for the one or more products at the retail store, the demand machine learning model comprising a first model for predicting the total unit demand for the retail store and a second model for predicting the demand in the retail store for the one or more products, the demand training set comprising the historical data, the forecast comprising multiplying the prediction of the total unit demand for the retail store for a predetermined time-period by the prediction of the demand in the retail store for the one or more products; and outputting the at least one output analytic to the user.

In a particular case, the forecast further comprises adding a covariate for a stock out condition.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
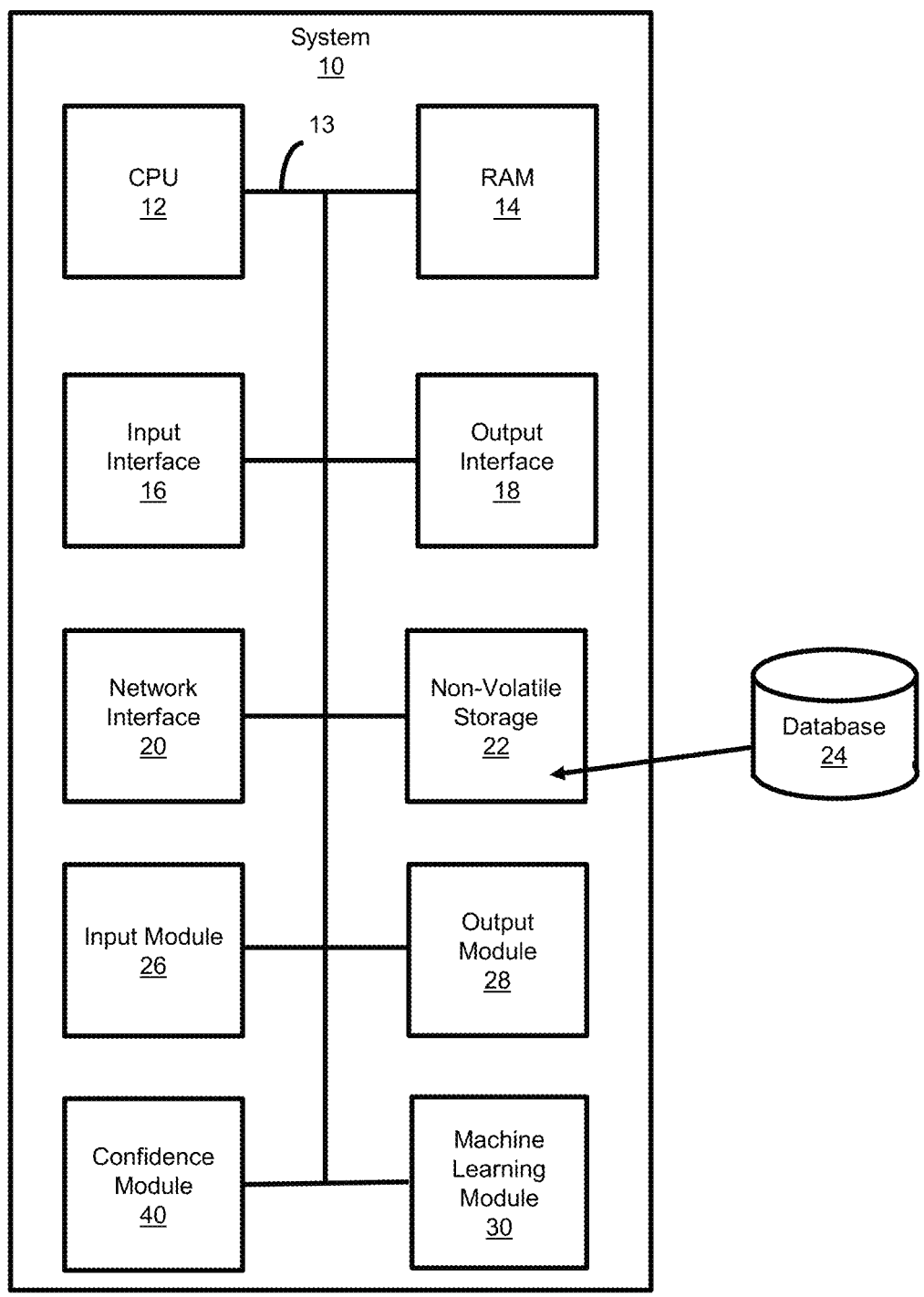
FIG. 1 is a schematic diagram of a system for promotion optimization in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to a method and system for generation of at least one output analytic for a promotion. The method and system provide a technological approach for analyzing historical data in order to automatically solve the technical problem of determining optimized aspects of a promotion using historical data. In some cases, predictions can be generated with respect to the aspects of the promotion.

The promotion can include any suitable marketing or publicizing of one or more products. Product, as used herein, is understood to include goods, services, or any suitable offering by a company or person; and can include, for example, any merchandise, service, venture, event, subscription, or donation opportunity that is offered, promoted, sold, or otherwise advertised to consumers, businesses, or the general public. Product can also include a product group, subcategory of products, or any other collection of products. Store, as generally used herein, can include any suitable establishment or interface in which goods or services can be sold or provided, including those provided online.

In a particular embodiment, as described herein, the promotion can include generation of promotional materials. Promotional materials can include, for example, flyers, brochures, leaflets, inserts, admail, or the like. The promotional materials referred to herein can be in the form of physical hard copies or digital soft copies.

Referring now to FIG. 1, a system 10 for generation of promotion analytics, in accordance with an embodiment, is shown. In this embodiment, the system 10 is run on a server. In further embodiments, the system 10 can be run on any other computing device; for example, a desktop computer, a laptop computer, a smartphone, a tablet computer, a point-of-sale ("PoS") device, a smartwatch, or the like. The system 10 enables the determination of analytical data features of a promotion.

FIG. 1 further shows various physical and logical components of an embodiment of the system 10. As shown, the system 10 has a number of physical and logical components, including a central processing unit ("CPU") 12, random access memory ("RAM") 14, an input interface 16, an output interface 18, a network interface 20, non-volatile storage 22, and a local bus 13 enabling CPU 12 to communicate with the other components. CPU 12 executes an operating system, and various modules, as described below in greater detail. RAM 14 provides relatively responsive volatile storage to CPU 12. The input interface 16 enables an administrator or user to provide input via an input device, for example a keyboard and mouse. The output interface 18 outputs information to output devices, such as a display and/or speakers. The network interface 20 permits communication with other systems, such as other computing devices and servers. Non-volatile storage 22 stores the operating system and programs, including computer-executable instructions for implementing the operating system and modules, as well as any data used by these services. Additional stored data, as described below, can be stored in a database 24. During operation of the system 10, the operating system, the modules, and the related data may be retrieved from the non-volatile storage 22 and placed in RAM 14 to facilitate execution. In an embodiment, the system 10 further includes an input module 26, an output module 28, and a machine learning module 30.

Figure 2:
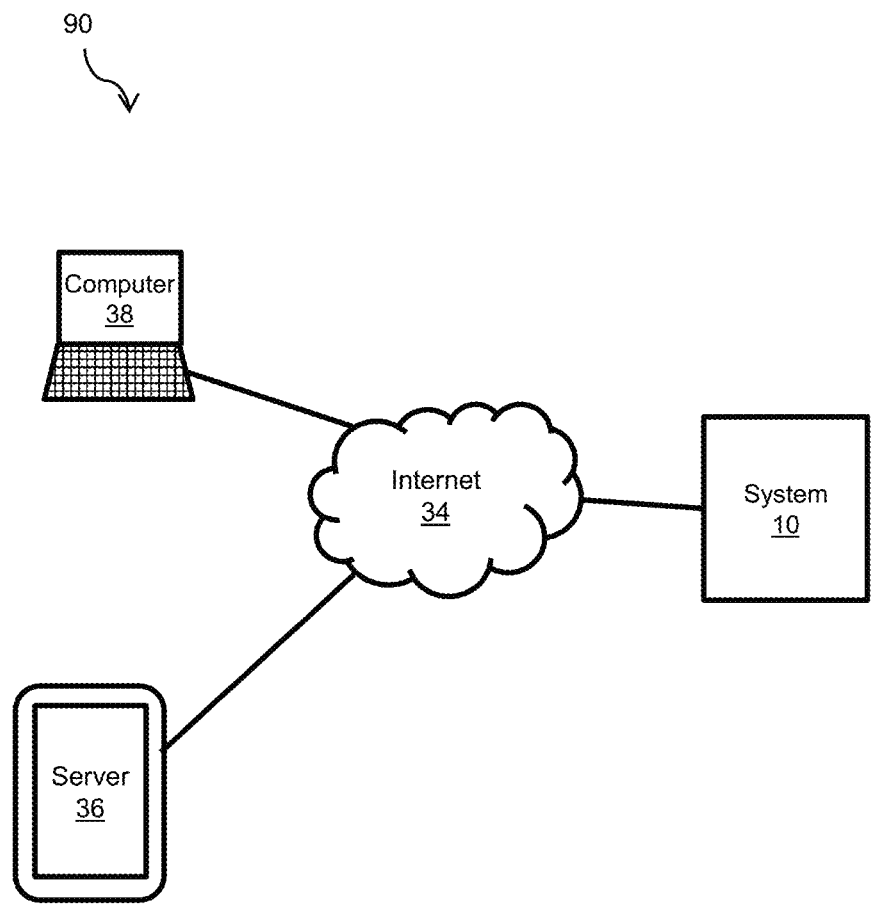
FIG. 2 is a schematic diagram showing the system of FIG. 1 and an exemplary operating environment.

In some cases, as shown in a diagram of a computing environment 90 in FIG. 2, the system 10 can communicate with, and retrieve data, from other computing devices; for example, a laptop computer 38 and a server 36. The system can communicate with these devices over a data communication network; for example, the Internet 34.

Promotions can come in different types and be directed to different targets. "Mass promotions" can be directed to the general public; for example, a promotion for milk for $1.99 to anyone who walks in to a store. "Direct promotions" can be directed and sent to a specific person or group's contact; for example, via email, short message service, traditional mail, apps, or the like. "Select promotions" can be directed to persons who are part of a selected group; for example, promotions only available to individuals who have a loyalty card.

A common problem with developing promotions is determining optimal analytical aspects of the promotion and using such analytics to forecast demand. As an example, given a product (identified or referred to by its stock keeping unit (SKU)), its history of promotions and transactions, and any additional relevant causal factors, trying to predict the future demand of the SKU for a given promotion mechanic.

Figure 3:
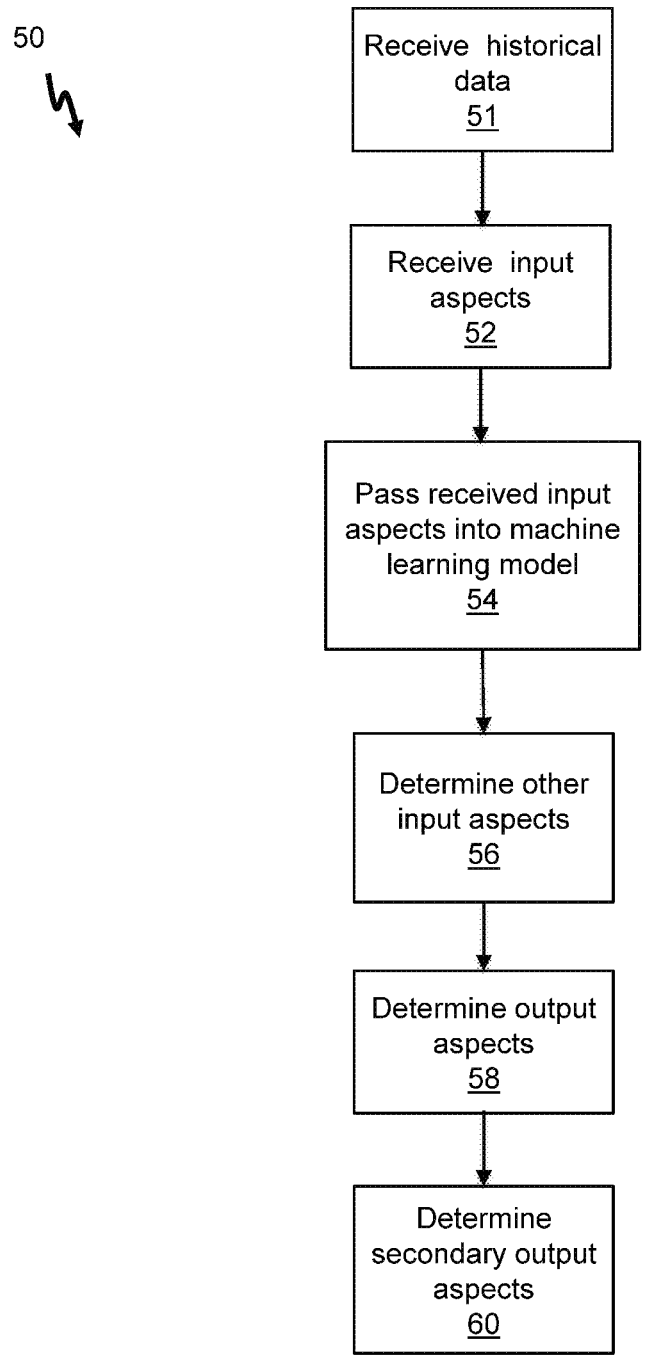
FIG. 3 is a flow chart of a method for promotion optimization in accordance with an embodiment.

Turning to FIG. 3, a flowchart is shown for a method 50 for generation of promotion analytics. At block 51, historical data related to one or more products and a plurality of previous promotions is received by the input module 26. At block 52, at least one input parameter of the promotion, as described below, is received from the user via the input interface 16 to the input module 26. In most cases, the input parameter received from the user will reflect the macroscopic objective of the promotion; for example, product uplift, product sales target, or product demand targets. In some cases, the input parameter received from the user can also include input parameters that constrain the promotion;

such as, transaction history, which product is to be promoted, how the product is to be promoted, or other limitations.

At block 54, the machine learning module 30 passes the received input parameters through a machine learning model, as described herein. In some cases, the machine learning model can use time series approaches that primarily use historical data as basis for analytically estimating future behavior. Time series approaches can include, for example, ARIMAX, AR, Moving Average, Exponential smoothing, or the like. In further cases, the machine learning model can use regression based approaches that use a variety of factors (including past data points) to predict future outcomes with an implicit concept of time (through the data points). Regression based approaches can include, for example, linear regression, random forest, neural network, or the like.

At block 56, in most cases, the input module 26 determines, via the machine learning module 30, at least one other input parameter of the promotion. The input parameters, as described herein, can include, for example, product selection, promotion mechanics, time period for promotion, other causal factors, or the like. The input module 26 determines values for the other input parameters which optimize the forecast based on the constraints of the received input parameters.

The historical data can include transaction history, for example, historical data relating to the product. The historical data can include, for example, date sold, product, units sold, price sold, or the like. In some cases, the transaction history can also include historical data relating to similar products, for example, products in the same product category.

The promotion mechanics can include the device or arrangement in which the product is promoted. For example, a promotion whereby the customer can buy two of the products and get one free, lasting from April $1^{st}$ to April $14^{th}$. In another example, a promotion whereby the product's price is reduced 50%, lasting from December $1^{st}$ to December $25^{th}$.

The other causal factors can include, for example, budget, vendor subsidy, seasonality, distribution, appearance, stock, SKU age, star buy, feature promotion, points promotion, shelving, or the like. Seasonality can include, for example, the time of year of the promotion, whether it is around the holiday season, or the like. Distribution can include, for example, which stores receive the promotion, the quantity of stores that receive the promotion, which areas of the country receive the promotion, or the like. Appearance can include, for example, which shelves the product is displayed in a retail environment (such as on end-cap shelving), whether there is additional signage around the product, or the like. Stock can include, for example, if the promotion is for a limited run of stock of the product, the stockout percentage, or the like. SKU age can include, for example, the time since first sale of the product. Star buy can include, for example, an enhanced special promotion, for a very limited time, in which the product is heavily promoted, in addition to a steep discount in price. Feature promotion can include, for example, a promotion which does not include a price change but is more heavily featured in the store or in advertising. Points promotion can include, for example, providing additional points for purchase of the product in a loyalty program. Shelving can include, for example, selecting featured shelving for the product or providing the product on secondary shelves where the product is not typically located.

At block 58, output analytics related to the promotion are determined by the output module 28 via the machine learning module 30. The output analytics can include, for example, forecasted demand, forecasted price, baseline demand, baseline price, forecast without promotion mechanics, inventory forecasting (such as at a warehouse or store level), or the like. Forecasted demand can be a determination of the number of units of the product projected to sell for a given period while the product is on promotion; in some cases, this can be analyzed for each given promotion mechanic. In some cases, this forecast can be at a per-store level, per-distribution centre level, or the like. Forecasted price can be an analysis of the forecasted average price per unit of the product while the product is on promotion. Baseline demand can be a determination of the number of units projected to sell for the given period while the product is on promotion if the product was to have not been put on promotion. Baseline price can be a determination of the average price per unit of the product if the product was to have not been put on promotion.

At block 60, other secondary analytics can be derived from the output analytics by the output module 28. For example: deriving uplift as a result of the promotion; deriving cannibalization as a result of the promotion; deriving halo effect as a result of the promotion; deriving basket penetration as a result of the promotion (distinct number of transactions that a product has been in for a given time period); deriving residual basket value (the average basket size when product is sold, minus the product); and the like.

In some cases, the user, via the input interface 16, can adjust the input parameters in the input module 26 after a forecast has been provided, in order to determine which input parameters arrive at a forecast for a desired output.

The machine learning module 30 can use machine learning techniques with the machine learning model (called a promotion forecasting model) to forecast output analytics. The promotion forecasting model can be trained using input parameters related to past promotions. In further cases, the promotion forecasting model can be instantiated with data, such as transaction history, provided by a user.

In some cases, multiple promotion forecasting models can be used such that their results may be averaged or weighted accordingly.

In a particular case, the machine learning module 30 can use a regression model to determine forecasted lift as a result of a promotion. Since there may not be a control group for the prediction, the incremental lift can be estimated in terms of sales or units sold. For example:

$$\log(\text{daily\_sales}_{promo(dow)}) = \beta_1 \log(\text{daily\_sales}_{pre(dow)}) + \beta_2(\text{promos}_{promo(dow)} - \text{promo}_{pre(dow)}) + \beta_3 \mathbb{1}(\text{Mon}_{promo(dow)}) + \ldots + \beta_g \mathbb{1}(\text{Sun}_{promo(dow)})$$

Where:
  daily sales$_{promo(dow)}$: is the average daily sales for a given product group for that particular day of the week in the promotion period;
  daily sales$_{pre}$: is the average daily sales for a given product group for that day of the week in a preceding period prior to promotion;
  promos$_{P(dow)}$: is the average number of promotions for the given product group on that day of the week for the given period P; and
  $\mathbb{1}()$: is the indicator function (1/0) depending on whether day t is the given day of the week.

In the above case, regression is performed on a daily basis to account for the fact that many promotions do not align with weekly boundaries. In further cases, other time periods may be used. Additionally, the above case treats each promotion equally (without regard to the type) and considers the number of promotions (being the difference in the number of promotions between the preceding and promotion periods).

In further cases, an L2 regularized regression (ridge regression) can be used to achieve an intended robust result. L2 regularization in the case of ordinary linear regression can include putting a Gaussian prior on the coefficients. Without the regularization, Applicant determined that the coefficients may not produce reasonable results as sometimes the indicator coefficients can have too much weight associated with them. With regularization, Applicant determined that estimates appear to be more objectionably reasonable.

Once the regression model is determined by the machine learning module 30, intermediates values can be determined, including:
- $sales_{actual}$: the prediction of the actual sales during the promotion period produced by the model. This may require to summing over the day of week values predicted from the model. It should thus be relatively close to the actual sales during the promotion period.
- $sales_{no\_promo}$: the total estimated sales as predicted by the model, but with subtracting one from $promos_{promo(dow)}$. As such, this can estimate what the sales would have been if the current promotion did not run.

The promotion lift can then be determined by the machine learning module 30 as:

$$PromotionLift = sales_{actual} \frac{sales_{no\,promo}}{sales_{actual}}$$

The above approach can be used instead of a direct computation of the 'actual sales' minus 'sales with no promotion' because the estimate for no promotion is generally on a different scale than the actual sales. Specifically, if the estimate of $sales_{actual}$ is off from $sales_{actual}$ then this bias will be included in the estimate of promotion lift. Instead, the relative change is extracted in 'actual vs. no promotion', which is predicted by the model, and uses this to adjust the actual sales.

In another particular case, price elasticity analytics can be forecasted as a measure of the sensitivity of unit sales to changes in price. In this example, the model for price elasticity that is used is the multiplicative model. The multiplicative model can model demand using the following regression model:

$$\log(Q_{i,t}) = \eta\log(P_{i,t}) + \beta_1 promos_{i,t} + \beta_2 I(\mathrm{Jan}(t)) + \ldots +$$
$$\beta_{13} I(\mathrm{Dec}(t)) + \beta_{14} I(\mathrm{store}_{format_0}(i)) + \ldots + \beta_{14+k-1} I(\mathrm{store}_{format_{k-1}}(i))$$

Where:
- $Q_{i,t}$: is the normalized units for week t basis for store format i (normalized by, for example, average weekly unit sales);
- $P_{i,t}$: is the normalized average price for week t basis for store format i (normalized by, for example, average weekly price);
- I(Jan(t)); . . . ; I(Dec(t)): are the set of indicator variables (1/0) if t falls in that month;
- I(store_format$_0$(i)); . . . ; I(store format$_{k-1}$(i)): are the set of indicator variables (1/0) store i is of the given store format; and
- η is the price elasticity.

η is the price elasticity due to the definition of point price elasticity being:

$$E_d := \frac{P}{Q}\frac{dQ}{dP}$$
$$\log Q = \eta\log P + \ldots$$
$$\frac{d\log Q}{dP} = \frac{d(\eta\ln P + \ldots)}{dP}$$
$$\frac{1}{Q}\frac{dQ}{dP} = \frac{\eta}{P}$$
$$\eta = \frac{P}{Q}\frac{dQ}{dP}$$

Similar to above, L2 regularized regression (ridge regression) can be used to get an intended robust result.

$E_d$ can be interpreted as:
- $E_d$=0: Perfectly inelastic demand;
- $-1<E_d<0$: Inelastic or relatively inelastic demand;
- $E_d$=−1: Unit elastic demand (change in one unit of price, results in one unit of quantity);
- $-\inf<E_d<-1$: elastic/relatively demand; and
- $E_d>0$: inverse demand relationship (demand increases with price).

In another particular case, the promotion forecasting model can use at least one of an average price model and a regression model. The average price model can predict effective average price using promotion mechanics. Effective average price is understood to mean that an observed average price (total sales divided by total units). This price may not always match the promotion price due to various factors such as a promotion requiring a trigger (for example, buy 2 get 1 free), or due to small differences in the stores the product is on sale. The regression model can predict demand using covariates such as, for example, average price from the average price model, relevant additional promotion mechanics, and any other relevant causal factors.

A reason for the double-pronged promotion forecasting model can be two-fold. First, price (or effective price) is generally the primary driver of sales; so translating promotion mechanics into an average price can work particularly well. Second, causal factors generally affect the promotional demand more than trend behavior. Applicant determined this is due to because when a promotion occurs, the promotion is typically a step function (not on sale to on sale). Additionally, relevant seasonal terms or long term trends can be easily encoded within a regression problem.

In an example of system 10, data can be aggregated for each week on a total-store basis. In this way, a feature table can be indexed by SKU, week, and the like, with a real number for each of the resulting feature columns.

In an example, there are various types of promotion mechanics that may be used by the system 10. For instance, there can be a direct price discount, such as price changes from $100 to $80. There can be unit incentive, such as, buy 2 units and get 1 unit free. There can be a quantity discount, such as buy 5 units for $10 each instead of a typical price of $12 per unit. There can be a percentage quantity discount, such as buy 5 units and get 25% off the purchase price.

In further examples, there may be more complex types of promotion mechanics. For instance, there can be group promotions, such as if a customer buys 3 units of any of products A, B, or C, they can get 1 unit free of any of products A, B, or C. There can be gift promotions, such as if a customer buys 3 units of any of products A, B, or C, they can get product D for free as a gift. There can be member promotions, such as a customer can get a discounted price on product A if they are a member of the store's mailing list.

In further cases, any combination of promotion mechanics may be stacked together as a combined promotion.

The machine learning module 30 can use raw promotion data to encode each one of the promotion mechanic types into several columns. For example, for a "Buy 2 units, get 1 unit free" promotion, the machine learning module 30 can use the following columns to encode it:
buy condition=units;
threshold=3;
reward=1;
reward type=free item; and
item=SKU.

In general, one column (e.g. buy condition) can determine the interpretation of another column (e.g. threshold). To resolve this issue, a set of columns for each of the different types of promotions can be created. For the above example (type 001, non-group promotion), there can be:
001_threshold_unit_non_group—real value if threshold for purchase is in units promotion subtype;
001_threshold_value_non_group—real value if threshold for purchase is in dollars promotion subtype;
001_reward_unit_non_group—indicator if reward is in units promotion subtype;
001_reward_value_non_group—indicator if reward is in units promotion subtype;
001_percentage_discount_unit_non_group—computed relative discount if units promotion subtype; and
001_percentage_discount_unit_non_group—computed relative discount if units promotion subtype.

The machine learning module 30 can similarly repeat the column creation for other types of promotions. An advantage of this type of encoding scheme is that such scheme can deal with stacking promotions of different types on the same SKU, at the same time; since it is generally not an issue if different columns for different types of promotions overlap. If two promotions of the same type are stacked, the machine learning module 30 can aggregate the duplicated rows (e.g. take an average), which, in some cases, works out in the regression (half-way between the two promotions).

In further cases, the machine learning module 30 can use other features in the promotion forecasting model.

The average price model can be used to approximately predict the average effective discounted price (called "avg price") as an outcome variable from the promotion mechanics. The prediction can use a machine learning model, such as a Random Forest model, such that: avg price=Random Forest(promotion_mechanics). In some cases, the prediction can be determined for each category separately.

Generally, explicitly mapping promotion mechanics to a predicted promotion price is complicated by the fact that there can be a copious number of fields. Accordingly, the machine learning module 30 can use a machine learning model that can effectively learn this mapping function, while being able to interpolate between unseen corner cases; so long as the given category has enough training data. Each row of the training data can be formulated as:
avg price: average price of SKU divided by regular price (value between 0.0 and 1.0) for a given time period (outcome variable); and
promotion mechanics: as described herein, SKUs with stacked promotions are averaged to produce a single row for each (SKU, time period) pair.

The test data is formulated by taking the promotion mechanics for the target time period to get a predicted avg price of between 0.0 and 1.0 of the regular price (non-promotion price). To determine the predicted average price, the raw model output can be multiplied by the regular price. Since the output is with respect to the regular price, data from any number of different priced SKUs can be pooled, which can partially solve the data sparsity problem for any single SKU. In some cases, there is some randomness (i.e. non-deterministic) when translating promotion mechanics to average price because some mechanics need to be triggered; for example, in a buy two and get one free promotion mechanic, some people will only buy one and thus never trigger the promotion.

Once the average price model has been fit on an entire category, in some cases, the regression promotion forecasting model can be used by the machine learning module 30 to train models. The regression promotion forecasting model can be trained both on a per SKU and, in some cases, on a per brand or subcategory level to predict demand. The latter can be used to determine predictions on a per-SKU level, but trained on a group of SKUs within the same brand or subcategory. This can be useful to, for example, help fill in missing data and deal with data sparsity. Using each model, a set of features can be inputted and a prediction of the unit demand for a given set of features can be outputted, as in:

$$\text{units}=\text{Model}(\text{avg price}, \text{feature}_1; \ldots \text{feature}_k)$$

In some cases, an ensemble approach can be used by the machine learning module 30 because, as determined by the Applicant, such approach tends to be the most empirically accurate. Applicant has determined that some models do extremely well on many cases but falter on individual corner cases. As such, an ensemble approach can be used to mitigate this problem. In an example, an ensemble approach can include any one or more of:
training multiple models on the same SKU (or a group of SKUs in the same brand or category, for each training, the covariates or features, as well as the model type, are varied (the model type can be, for example, RidgeRegression, Random Forest, or the like);
determining a prediction using each of the trained models; and
determining a median value of all the predictions.

Any one SKU, even those with large transaction histories, typically will not have had the entire breadth of promotion mechanics in its history. Thus, in some cases, it can be advantageous to be able to pool data from multiple similar SKUs. In this way, effects can be estimated for a target SKU, even though that SKU may not have had those effects directly observed for it. However, there may be some complications of this approach, for example:
the units outcome variable can have largely different magnitudes for different SKUs, even for SKUs in the same subcategory or brand;
similarly, the price outcome variable can be significantly different between different SKUs; and
different SKUs may respond noticeably dissimilar to different promotion mechanics.

The Applicant determined that the above complications for pooling data can be overcome by normalizing the units and average price within a subcategory or brand such that the data may be reliably pooled together. In some cases, depending on the model, indicator variables can also be incorporated into the model for each SKU. For example, for each SKU, normalizing absolute units by a mean for non-promotion periods, and if such mean is not available, then normalizing by the mean of the SKU's entire history. When determining a prediction, the raw normalized model output data is multiplied by this scaling factor to get the prediction in terms of units. In some cases, average price is already normalized as described in the average price model. However, the predicted average price can be un-normalized by multiplying the average price by the regular price.

With respect to the Random Forest model employed by the machine learning module 30, in some cases, there can be two different Random Forest models with different covariates. In a first model, called "Model A", having features of, for example, avg price, SKU age, star buy, feature promotion, store segment, points promotion, and the like. In this case, the model can be trained on a per-SKU basis. In another model, called "Model B", there can be features of, for example, avg price, number of stores, number of active promotions, star buy, shelving, store segment, feature promotion, seasonality, points promotion, and the like. In this case, the model can be trained on a pooled SKU basis, such as across a subcategory or brand. In some cases, where there is training across multiple SKUs, there may be an indicator variable for each SKU.

Due to the nature of Random Forest models, these models can be better at interpolating rather than extrapolating data. Accordingly, these models are useful for "memorizing" past promotion information. These models are particularly advantageous when there is a lot of previous data (for example, many different price points) and a forecasted prediction resembles past behavior.

In a particular embodiment, the machine learning module 30 can use a Ridge Regression model as a base model. Generally, Ridge Regression can be interpreted as a simple linear regression with a zero-mean normally distributed Bayesian Prior. The machine learning module 30 can extend this model to handle certain additional situations.

First, the machine learning module 30 can "cap" the forecast at either a) mean+3*standard deviation, or b) a previous maximum. This cap may be needed because, in some cases, the regression estimates will extrapolate a demand that is a complete outlier. This cap can handle such a corner case.

Second, the machine learning module 30 can impose a non-zero mean Bayesian Prior that can help fill in missing or sparse data when making an estimate with respect to a single SKU. In some cases, the machine learning module 30 can implement a MAP estimation for a Bayesian prior using a Ridge Regression with Bayesian Prior.

Fitting a regression model on the pool of SKUs can advantageously provide coverage for all, or a significant portion, of possible covariates. In some cases, the coefficients from this model become the mean of the Bayesian Prior. The machine learning module 30 can use such coefficients as Bayesian Priors on per-SKU regression models. In cases where a SKU-level model has enough data to "override" the Bayesian Prior, then the estimate will typically be the same as without the Bayesian Prior. Otherwise, the Bayesian Prior can be used to fill the missing coefficient. The above approach can be viewed as an empirical Bayes approach. Such approach is made possible because of the normalization described above due to fitting the pooled SKUs model.

In a particular case, the machine learning module 30 can use two Ridge Regression models. In a first model, called "Model A", having features of, for example, avg price, SKU age, star buy, feature promotion, points promotion, and the like. In a second model, called "Model B", having features of, for example, avg price, stock, seasonality, store segment, shelving, star buy, feature promotion, points promotion, and the like. Both Model A and Model B can be trained by pooled SKUs based on subcategory or brand. In a particular case, an outcome variable can be the log(units); which can advantageously model the relationship with price more accurately because the relationship is typically a non-linear relationship between price and demand.

The ensemble approach can advantageously provide better accuracy when compared to other singular models. As an example, a simpler variant of Model A comprising just avg price and SKU age has shown suitable results overall because most items were driven by avg price, with a trend downward as the SKU aged. However, the simpler variant of Model A did not cover all cases, particularly where other covariates have a greater contribution.

In a particular embodiment of system 10, the system 10 can include a confidence module 40. For each one of the forecasts determined by the machine learning module 30, the confidence module 40 can provide a confidence indicator to indicate the reliability of such forecast. The confidence indicator can be, for example, a score (such as a score out of 10), a percentage, a colour marker (such as green, yellow, and red), or the like. The confidence module 40 determines the confidence indicator using an exemplary two-step process.

The confidence module 40 determines if each SKU is in scope, where out of scope SKUs are automatically marked as such. Determining if the SKU is in scope includes using business rules that determine whether aspects of a product are acceptable; such as determining whether the product is supported and not discontinued.

The confidence module 40 then uses a confidence machine learning model that is trained on previous SKU forecasts to determine the accuracy of previous SKU forecasts versus their actualized values. In an example, the confidence model can have the form:

forecast error=Regression Model(SKU features)forecast error:=log(1+((RK forecast units)/(actual units+1)))

In this case, the outcome variable is just the logarithm of the ratio of the units. The "+1"s are provided to avoid corner cases, such as dividing by zero and log(0). The data used to train the confidence model is taken from previous promotions. Examples of features that can be used with the confidence model include: mean or standard deviation of a product's price; units; stockouts; number of promotions; number of stores at different time periods; and the like. The confidence module 40 can use several ratios of the above features. The confidence module 40 can also use other indicator features for sub-category, product status, or the like.

In some cases, the confidence module 40 can be used for cutting off forecasts if the confidence in the prediction is too low; for example, where the forecast is below a given confidence score.

In further cases, confidence can be determined by the confidence module 40 using other metrics, for example, model fit metrics, mean absolute percentage error, or the like.

Figure 10:
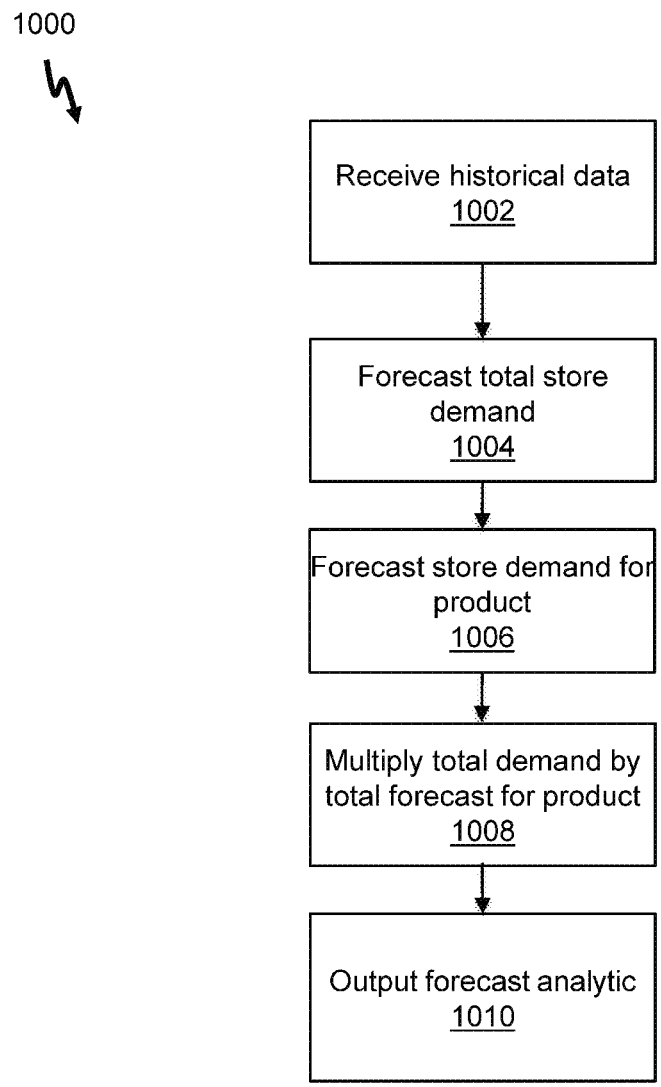
FIG. 10 is a flow chart of a method for generation of at least one output analytic for per-store unit demand, according to an embodiment.

In some embodiments, as shown in the method 1000 of FIG. 10, the machine learning module 30 can determine a per-store unit demand forecast model. This type of forecast can be advantageous because when ordering inventory, supply chain managers typically require a per-store unit demand forecast. At block 1002, historical data related to one or more products is received, the historical data comprising historical inventory level of the one or more products at a retail store. At block 1004, the machine learning module

30 builds a machine learning model, as described herein, to forecast a ratio for total store level unit demand. At block 1006, the machine learning module 30 also builds a machine learning model to predict the total store demand for a particular product. At block 1008, the machine learning module 30 can determine a per-store SKU forecast by multiplying the total store level unit demand by the total store level SKU forecast. This forecast analytic can then be outputted at block 1010. This approach can be advantageous because each individual store may not sell many units in any given time period. This makes it very difficult to predict a given store's unit demand, whereas at a total store level, the demand is much more predictable.

The per-store unit demand forecast model makes use of the idea that for a given SKU, take, for example, a 4 week average unit sales per store, and use those proportions to multiply by the total-store forecast. In an example, this model (per SKU) can be formalized as:

$$y_i = \beta_i^0 \text{proportion for store } i = \frac{y_i}{\sum_{i=1}^n y_i}$$

where $y_i$ is the unit demand for store i.

In an example, the above equation is equivalent to a 4 week average assuming that the model is only trained with data representing the past 4 weeks of unit demand. This is due to the constant coefficient being the average of the 4 week demand, as the proportion is the relative unit demand of this average.

In further cases, there may be variations of the per-store unit demand forecast model. A first variation can be adding an additional covariate for the percent number of days stock out (per store). The reasoning behind this variation is that if a store stocks out of an item, the above equation will under stock the item, causing the store to stock out of the product. This can cause the store to then under or over order, possibly leading to a cycle of out of stock situations. In this variation, by adding a covariate for stock out, some of these situations can be absorbed to ensure that the forecasted average is closer to the actual demand. This variation can be formalized as:

$$y_i = \beta_i^1 \text{stockout}_i + \beta_i^0 \text{proportion for store } i = \frac{y_i}{\sum_{i=1}^n y_i}$$

In another variation, the above equation can be used, except that instead of using raw units, proportions for a given week as used. The proportions are called n for a given sore i. In this case, the training points can be varied to any suitable time period. This variation can be formalized as:

$$r_i = \beta_i^1 \text{stockout}_i + \beta_i^0 \text{proportion for store } i = \frac{r_i}{\sum_{i=1}^n yr_i}$$

In some cases, the proportion of outputs for each store can be adjusted by a range of view. Assuming, there is an indicator for the range of view called vi, which is 1 if store i is in range of view for the given time period, and 0 otherwise. This can be formalized as:

$$\text{adjusted proportion for store } i = \frac{v_i y_i}{\sum_{i=1}^n v_i y_i}$$

Figure 4:
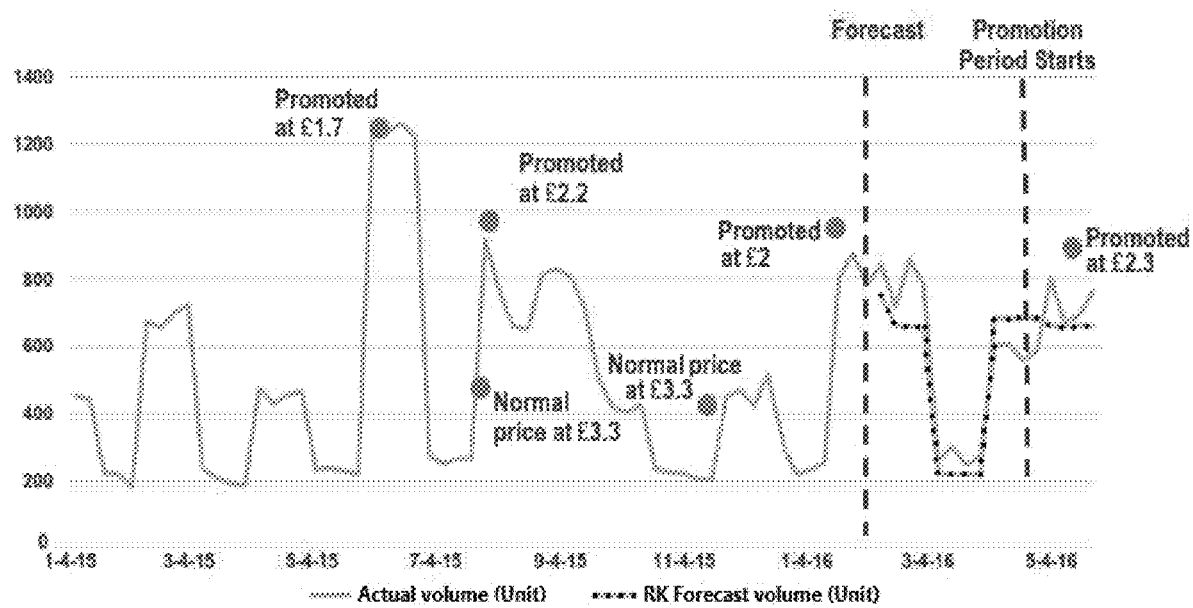
FIG. 4 is an exemplary promotion forecast generated by the system of FIG. 1.

Turning to FIG. 4, an example promotion forecast is shown, according to embodiments described herein. The example promotion forecast can be output to a user via the output interface 18. In this example, forecasts for a four-week promotion of a discounted product are provided.

Advantageously, the embodiments of system 10 are intended to provide more accurate forecasts using multiple factors (for example, past sales, trends, price, promo mechanics, and the like). Further, the embodiments of system 10 are intended to advantageously provide automated and consistent forecast methodology and confidence indicators for each forecast. This is intended to provide for a reduction in stockouts and excess inventory, and prevent negative short term or long term financial impacts.

In a further embodiment, the machine learning module 30 can be used to provide insights on previous promotions. Insights can include, for example, promotion lift, cannibalization, halo effect, pull forward, price elasticity of demand, and the like.

The machine learning module 30 uses the machine learning model to evaluate and measure past promotions. This can be advantageous because it can provide a full data driven comprehensive view of past performance of promotions. In some cases, the evaluation is advantageously based on total uplift, taking into account baseline sales, and the negative effects of cannibalization, halo, and pull forward. Thus, advantageously, determining uplift not just based on raw sales. In further cases, the evaluation can also include: promotion lift as a measure of incremental promotional lift of the promotion in comparison to a baseline; price elasticity as a measure of impact of price changes to demand; residual basket value as a measure of average basket size when this product is sold, minus the product; basket penetration as a measure of the proportion of transactions involving the product; item importance as a measure of impact that a product has on a category; and customer centric determination as a measure of the effect of the promotion across different customer groups.

Figure 5:
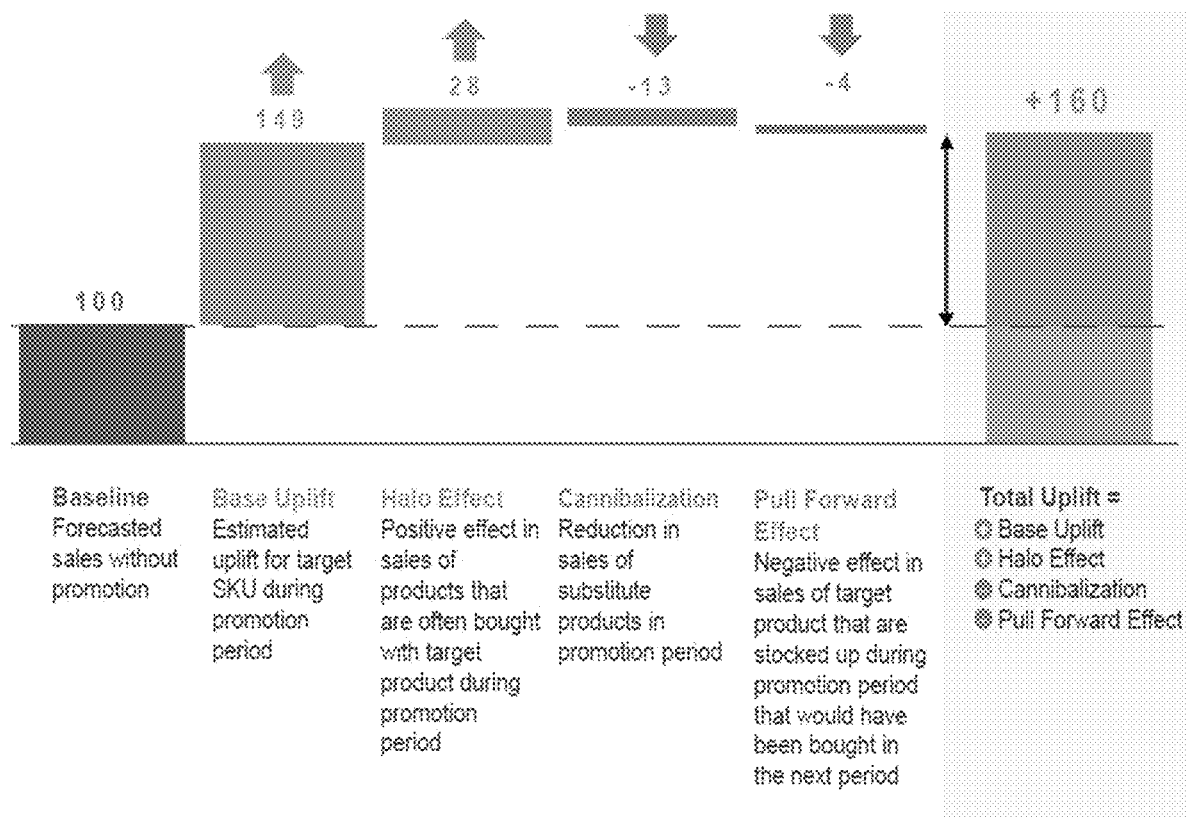
FIG. 5 is another exemplary promotion forecast generated by the system of FIG. 1.

FIG. 5 shows an example output of the evaluation of past promotions, as output to a user via the output interface 18.

Figure 6:
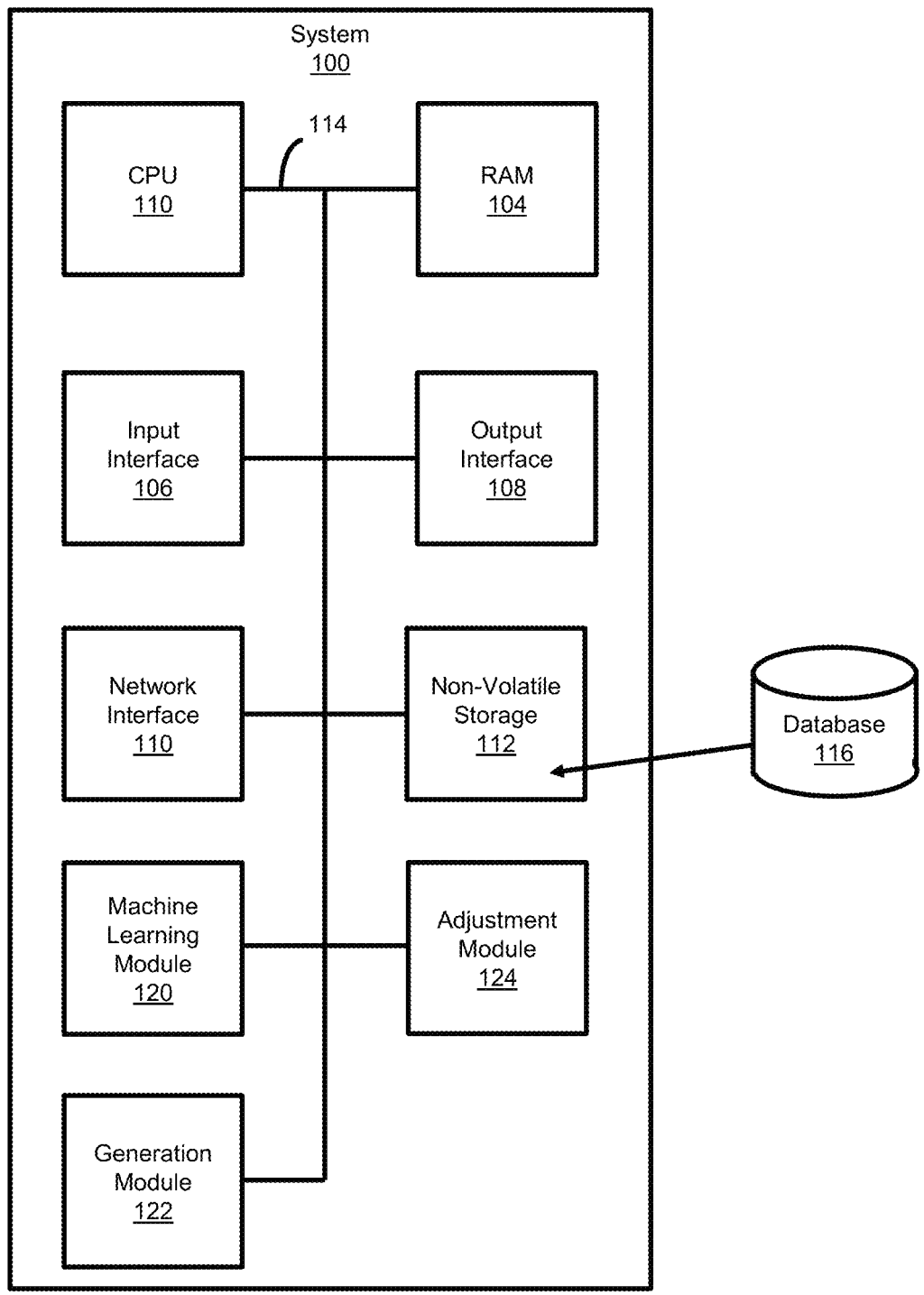
FIG. 6 is a schematic diagram of a system for optimizing promotional materials in accordance with an embodiment.
Figure 7:
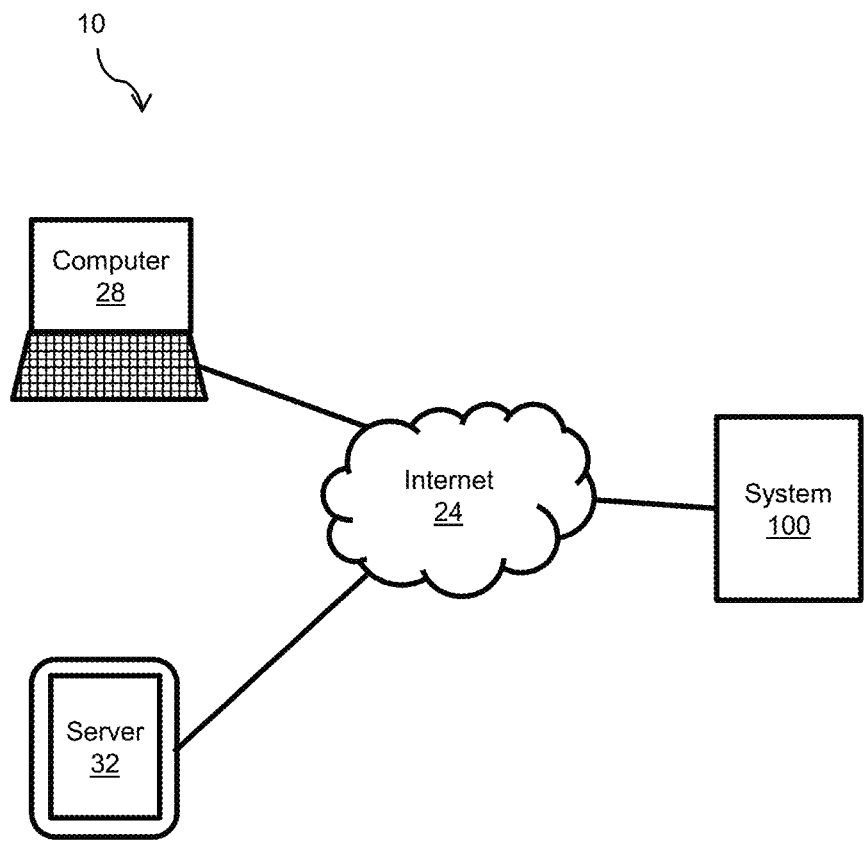
FIG. 7 is a schematic diagram showing the system of FIG. 6 and an exemplary operating environment.

In exemplary embodiments of the system 10 described herein, as shown in FIG. 6, and as follows, there is provided a system 100 for optimizing promotional materials. In an embodiment, the system 100 is run on a server. In further embodiments, the system 100 can be run on any other computing device; for example, a desktop computer, a laptop computer, a smartphone, a tablet computer, a point-of-sale ("PoS") device, a smartwatch, or the like. The system 100 enables the generation of optimized promotional materials that can then be delivered to recipients physically, for example through the mail, or digitally, for example via e-mail.

As part of determining aspects of a promotion, a company may generate promotional materials (also called advertisements). Advertisements are a primary resource for companies to get information of their product(s) out to consumers or other businesses, as the case may be. However, the promotional area on these materials is often limited. The promotional area can be physically limited; for example, a limited amount of space on each page and/or a limited amount of pages. The promotional area can also be limited in that a customer has a limited attention span for reading the promotional materials; for example, if the materials are too long, too dense or overly comprehensive, the reader will often forgo reading portions of the promotional materials. In order to optimize the effect of the promotional materials on an intended audience, the system 100 can make determinations for a variety of attributes of the advertising products. As described further herein, the system 100 can make certain determinations of the attributes of the promotional materials; for example, which products to put on the advertisement material, the distribution of the products on the advertisement material, the space encompassed by promotion of the product, and what aspects of the product to highlight. In an embodiment, the system 100 can then generate promotional materials based on the above determinations.

In a further embodiment, the system 100 can make a determination as to who is the intended audience and who should receive the promotional materials.

FIG. 6 further shows various physical and logical components of an embodiment of the system 100. As shown, the system 100 has a number of physical and logical components, including a central processing unit ("CPU") 102, random access memory ("RAM") 104, an input interface 106, an output interface 108, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. The network interface 110 permits communication with other systems, such as other computing devices and servers. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution. In an embodiment, the system 100 further includes a machine learning module 120, an adjustment module 124, and a generation module 122.

To generate the optimized promotional materials, the system 100 performs an analysis of historical data to find an optimized configuration for the promotional materials. The historical data can be gathered from a variety of sources. The historical data may include previous promotional materials, and the results of distributing such previous promotional materials. For example, the cost of generating the previous promotional materials, the cost of distributing the previous promotional materials, and product-level results of the previous promotional materials. The product-level results can be, for example, the area on the promotional materials occupied by a certain product, the location in the previous promotional materials of the certain product, the promotional aspect advertised with respect to the certain product (such as the sale price), how many units of the product were sold in a selected period after distribution of the promotional materials, how much cannibalization occurred on other products due to the advertising of the certain product, how much halo effect occurred (i.e. effect of promotion on one item influencing customers to purchase other items), and the like.

The historical data can be gathered from a variety of sources, for example, through the interaction with digitized point-of-sale machines, loyalty programs, digital communication channels, databases of previous promotional materials and various other means. The historical data can be gathered on a product-by-product basis; or on a basis of promotional materials, whereby in some cases the product level information can be extrapolated. The various product data can be collected, for example, through PoS terminals, recurring billing (in the case of contractual services), and e-commerce websites of the transactional variety, and through other means such as market research, 3rd party aggregation, and other data resellers and brokers. The system 100 draws upon this product data from the various channels in order to better understand the behavior of each customer. The system 100 mines this data and applies statistical and machine learning approaches to yield recommendations and actions that enable the optimization of promotional materials.

The solution provided by the system 100 is one that allows generation of promotional materials that are optimized. The system 100 uses a combination of constrained optimization, prediction, and reinforcement learning to directly optimize the generation of promotional materials. For example, optimization can result in any output measure, such as revenue uplift, unit sales uplift, profitability uplift, or some combination thereof. The system 100 leverages the historical data to make predictions about what products and promotions should be placed on the promotional materials to optimize the results of the promotional materials.

Figure 8:
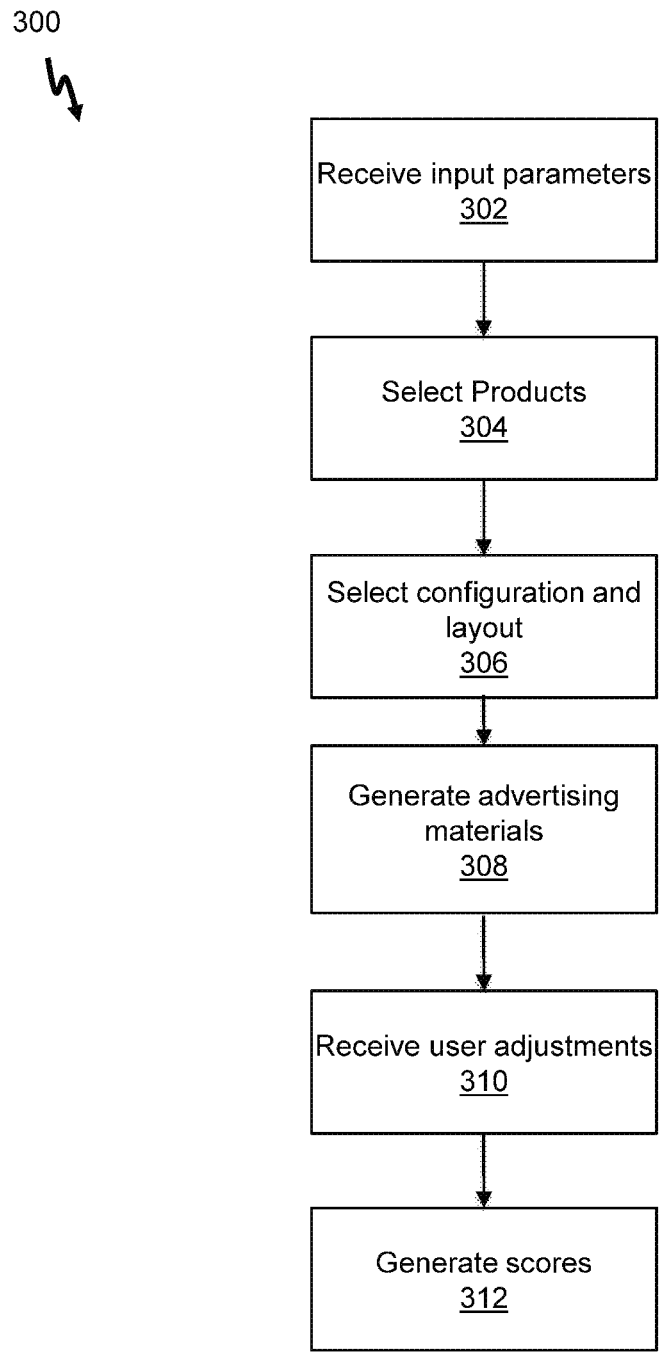
FIG. 8 is a flow chart of a method for optimizing promotional materials in accordance with an embodiment.

Turning to FIG. 8, an exemplary embodiment of the method 50 described herein is shown in a flowchart for a method 300 for optimizing promotional materials.

At block 302, the system 100 receives input parameters from a user via the input interface 106. The input interface 106 can include, for example, a keyboard, a mouse, a touchscreen, or the like. The input parameters can include, for example, the date for distribution of the promotional materials, the desired length of product promotions, the size of the promotional materials, the length of the promotional materials, the type of distribution of the promotional materials, the geographic scope of the promotional materials, the desired sales outcome or margin for a product, products, or the promotional materials as a whole, or the like.

At block 304, the machine learning module 120 selects which products are to be included in the promotional materials based on a machine learning model. The selection of products can include determining which products, from a predetermined roster of products, are optimally ready to be promoted.

At block 306, the machine learning module 120 selects the configuration and layout of the products on the promotional materials based on the machine learning model. In one case, the machine learning module 120 determines which products are required to be featured more prominently in the promotional materials, and can determine a hierarchy of product prominence. The hierarchy can be determined by, for example, determining which products are required to be sold more readily and which products are more likely to entice a consumer to read through the promotional materials. The machine learning module 120 can also assign a weight to each of the products, called a prominence weight, that determines the relative prominence of each product. The prominence weight can be normalized, for example out of 100, such that the machine learning module 120 can find relative prominence weight for all the products in the promotional materials. In a certain case, the prominence weight can be normalized for each page in a multi-page advertising material.

Figure 9:
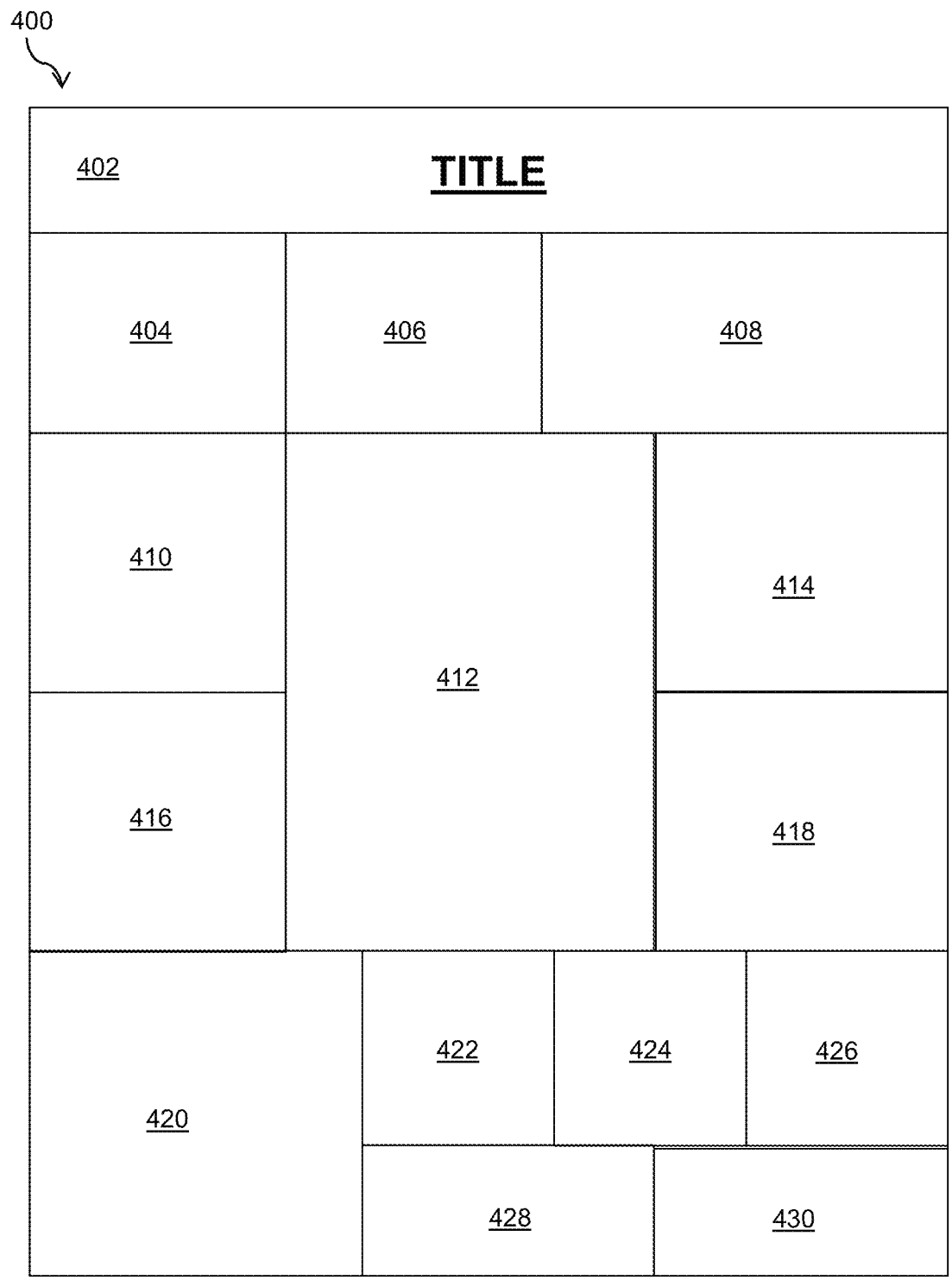
FIG. 9 illustrates an exemplary advertising material generated by the system of FIG. 6.

The machine learning module 120 can then determine the block structure and product layout on the promotional materials based on the machine learning model. FIG. 9 illustrates an example of a block structure of a page of an advertising material 400. In this example, the topmost block is a title block 402 and does not include a product, but rather has a title and/or identifying information about the entity that is distributing the advertisement material. The remaining blocks, product blocks 404 to 430, contain product related information. The product related information can be, for example, a picture of the product, a price of the product, a quantity limit of the product, noteworthy aspects regarding the product, product code, or the like.

Based on the normalized prominence weight, the machine learning module 120 can determine the size of the product blocks 404 to 430 for each product. In the example of FIG. 9, product block 412 includes a product having the highest prominence weight, and accordingly, product block 412 has the largest area of any of the product blocks 404 to 430. Product block 420 includes a product with the next greatest prominence weight, and accordingly, product block 420 has the second largest area of any of the product blocks 404 to 430. The area of the rest of the product blocks 404 to 410, 414 to 418, and 422 to 430 are likewise determined based on the prominence weight of the product included in the product block.

In the present embodiment, the machine learning module 120 can also make determinations regarding the location of each of the product blocks 404 to 430 on the advertising material based on the machine learning model. In the example of FIG. 9, the area of the page of the advertising material can be given different relative weighting. For example, the area closer to the center of the page can be given higher relative weight than the peripheral corners of the page. In another example, the area closer to the top of the page can be given higher relative weight than the area on the bottom of the page. In the example of FIG. 9, the location of product block 412 has the highest location weighting due to its central location, and product block 406 has a higher location weighting than product block 428 due to its higher location. In further examples, location weighting can be based on statistical considerations of where on the page a reader's eye is typically going to view and pay more attention.

In some cases, the product blocks 404 to 430 can include two or more products in one product block. In this case, the machine learning module 120 can average the prominence weight for the two or more products included in that one product block, and the prominence weights can be normalized accordingly.

At block 308, a generation module 122 generates the promotional materials using the block structure and product layout determined by the machine learning module 120. The promotional materials are then printable, sendable, or otherwise available for distribution via the output interface 108.

In further embodiments, the machine learning module 120 determines the block structure and product layout on multiple pages of an advertising material. For example, giving greater location weighting to pages closer to the beginning of the advertising material, or giving greater location weighting to the exterior facing pages.

In further embodiments, the machine learning module 120 can also assign a weight to the product blocks 404 to 430 based on conspicuity of elements of the product blocks. For example, the machine learning module 120 can provide a higher conspicuity weighting to product blocks with a more striking background color, such as bright yellow or deep red. In another example, the machine learning module 120 can provide a higher conspicuity weighting to product blocks with an eye-catching outline or shape, such as a star-shaped product block. In another example, the machine learning module 120 can provide a higher conspicuity weighting to product blocks with a noticeable text font, such as a bolded product name.

In further embodiments, the machine learning module 120 can provide an overall weighting taking into consideration at least two of the properties of the product blocks, the properties including the area, the location and the conspicuity of the product blocks. The overall weighting can weigh the properties evenly or unevenly; for example, weighing area as twice as important as location and four times as important as conspicuity.

In yet further embodiments, the system 100 can also include the adjustment module 124. At block 310, the adjustment module 124 allows a user to edit the promotional materials generated by the generation module 122 via the input interface 106. The editing can include, for example, removing a product from being displayed in the promotional materials, changing the length of the promotional materials, changing the prominence weighting of any of the product blocks, changing the properties of the product blocks including the area, the location and the conspicuity of the product blocks. The generation module 122 can then regenerate the promotional materials based on the changes received from the adjustment module 124. In some cases, the adjustment module 124 can keep a log on the database 116 of the changes requested by the user. In subsequent iterations of the system 100, the machine learning module 120 can take into consideration previous changes by the user, and weigh the product blocks accordingly. For example, if a user keeps vetoing placing a certain product in the promotional materials, the machine learning module 120 will refrain from placing that product on subsequent promotional materials.

In some cases, the machine learning module 120 can use a machine learning model that includes a set of data mining and machine learning building blocks, working in conjunction with the other modules, to generate predictive or explanatory scores of the outcomes of the promotional materials. The scores can be based on the historical data, as described above, as well as, for example, the predicted selling quantities of one or more products due to the distribution of the promotional materials, the predicted profit or revenue generated by the promotional materials, the return on investment of the promotional materials, the cannibalization of other products based on the advertised products, the pull forward of the products, the halo effected on other products, and the like. Both supervised and unsupervised learning techniques can be used in generating the scores. These scores are then used by the machine learning module 120 to configure and layout the promotional materials, as described herein.

The machine learning techniques used to generate these scores can be specific to the particular scoring source. There are a number of models that can be utilized by the machine learning module 120, as described herein.

The machine learning module 120 determines the best mode of achieving the goals of the marketing campaign specified by the user. In particular, the machine learning module 120 takes the inputs and constraints received via the input interface 106, and the outputted scores, and combines them to suggest to the machine learning module 120 values for the area, the location and the conspicuity of the product blocks. The machine learning module 120 then uses this suggestion to produce weightings as described above.

In some cases, the machine learning module 120 can be instantiated for each brand new set of data it receives. Prior promotional materials data can be imported into the system 100 to enable the machine learning module 120 to benefit from prior experience. This instantiation step is a mix of constrained optimization and conditional rules. The reason the machine learning module 120 is instantiated is because it may not have a base of decisions from which to learn what maximizes the objectives. In this case, there needs to be a base of matches for the reinforcement learning capability to have enough data to actually learn.

Beyond instantiation, the steady state of the machine learning module 120 shifts over to a reinforcement learning hybrid approach. As further data is collected by the system 100, the building blocks are re-trained and re-scored, and, as a result, new predictions are made for to be provided to the machine learning module 120. This reinforcement learning and feedback approach can be invoked repeatedly to further hone the scores. As this process continues, various iterations occur whereby promotional materials are distributed, outcomes are received and the building blocks are re-trained and re-scored.

The initial weighting system in the instantiation process begins to give way to a machine intelligent approach to matching the outcomes to the effect of the promotional materials. The machine learning technique used prioritizes learning in an environment whose outcomes can be considered as being partly due to randomness and partly due to phenomena under the control of the system 100. For example, lucrative offers of a product in the promotional materials have undoubted causal relationship to sales of that product, however, there may be other random factors which may have contributed to those sales.

In some cases, the machine learning model of the machine learning module 120 can take into account the seasonality of the products, as part of the historical data, in order to make recommendations based on the time of year of distribution of the promotional materials. As an example, sun screen advertised in the winter to residents of a northern country would not be optimal. Thus, placing sun screen products in advertisements that are distributed in the spring and summer are more likely to result in optimal sales effects. In some cases, a score is developed based on the seasonality of the advertised product for inclusion into the machine learning decision making, based, for example, on historical sales of the product around the date of distribution of the promotional materials or on input from the user.

In some embodiments, the components of the system 10, 100 are stored by and executed on a single computer system. In other embodiments, the components of the system 10, 100 are distributed among two or more computer systems that may be locally or globally distributed.

The system 10, 100 can be seeded with historical data from which inferences can be drawn, enabling reinforcement learning to be employed using the historical data prior to the collection of further customer data by the system. That is, where previous outcomes of promotional materials exist, and that data is readily available and interpretable, the instantiation phase can be skipped entirely in favor of implementing the machine learning.

In some cases, the system 10, 100 can change or re-train the models with which the determinations themselves are being calculated.

In some cases, the system 10, 100 can perform reinforcement learning "concurrently" with the receiving of outcome data via various channels, enabling the machine learning module 30, 120 to continue to learn from outcomes, and in some cases, learn new weightings.

With enough interaction history, the machine learning module 30, 120, as described herein, can be considered an artificially intelligent agent.

While the embodiments described herein generally refer to analytics of promotions by consumer-facing establishments, the described embodiments can be used for manufacturers, distributors, agencies, service providers, other business-to-business entities, or any other establishment or firm which markets its products or services or which can provide products or services at a discount.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for generation of a promotion analytic for a product promotion, the method comprising:
   receiving historical data and a plurality of previous promotions related to the product;
   receiving a first input parameter for the promotion from a user, the first input parameter comprising a macroscopic objective of the promotion or a constraint of the promotion;
   passing the received input parameter through a machine learning model using a time series or regression based approach and determining using the machine learning model, a second input parameter that optimizes a forecast of the promotion analytic based on the first input parameter, the second input parameter comprising a causal factor;
   forecasting the promotion analytic, based on the first and second input parameters, using an ensemble machine learning model, wherein forecasting using the ensemble machine learning model comprises,
      training at least an average price model comprising a first Random Forest model and a regression model on the historical data and the plurality of previous promotions related to the product, wherein for each training, covariates of each model are varied;
      determining a prediction of the promotion analytic using each of the average price model and the regression model;
      determining a median value of the predictions as the forecasted promotion analytic; and,
      outputting the forecasted promotion analytic to the user.

2. The method of claim 1 wherein, the average price model predicts an average effective discounted price of the promotion based on a category of products, and the regression model incorporates covariates to predict demand.

3. The method of claim 1, wherein the output analytic comprises forecasted demand, forecasted price, baseline demand, baseline price, forecast without promotion mechanics, inventory forecasting, promotion lift, cannibalization, halo effect, pull forward, or price elasticity of demand.

4. The method of claim 1, wherein the regression model is used to determine the discounted price prediction on a per-product basis on a group of products in the same brand or subcategory as the product, or both.

5. The method of claim 1, wherein one or more of the average price model and the regression model incorporates indicator variables for the one or more products, and determining the indicator variables comprises, for each product, normalizing absolute units by a mean for periods with no promotion, and where such mean is not available, normalizing by the mean of the product's entire history.

6. The method of claim 1, wherein the regression model is a Ridge Regression model or a second Random Forest model.

7. The method of claim 6 wherein the regression model is a second Random Forest model, the second Random Forest model comprising different covariates compared to the first Random Forest model.

8. The method of claim 1, wherein the historical data comprises one or more products in a similar category or brand.

9. The method of claim 1, wherein the plurality of previous promotions are aggregated in a stacked relationship.

10. The method of claim 1, wherein the historical data comprises transaction history for the product and one or more other products in the same product category, the transaction history comprising at least one of date sold, product, units sold, price sold.

11. The method of claim 1, wherein the macroscopic objective is product uplift, product sales target, or product demand targets.

12. The method of claim 1, wherein the constraint of the promotion is transaction history, which product is to be promoted, how the product is to be promoted, or another limitation on the product promotion.

13. The method of claim 1, wherein the causal factor is any one of product selection, promotion mechanics, time period for promotion, budget, vendor subsidy, seasonality, distribution, appearance, stock, stock keeping unit (SKU) age, star buy, feature promotion, points promotion, or shelving.

14. The method of claim 1, further comprising determining a confidence indicator to indicate the reliability of the forecasted promotion analytic, determining the confidence indicator comprising:
determining if the forecasted promotion analytic is in a predetermined scope; and
determining, using an accuracy machine learning model trained or instantiated with previous forecasts and their respective actualized values, the confidence indicator.

15. A system for generation of a promotion analytic for a product promotion, the system comprising one or more processors and a data storage device, the one or more processors configured to:
receive historical data and a plurality of previous promotions related to the product;
receive a first input parameter for the promotion from a user, the first input parameter comprising a macroscopic objective of the promotion or a constraint of the promotion;
pass the received input parameter through a machine learning model using a time series or regression based approach and determining using the machine learning model, a second input parameter that optimizes a forecast of the promotion analytic based on the first input parameter, the second input parameter comprising a causal factor;
forecast the promotion analytic, based on the first and second input parameters, using an ensemble machine learning model, wherein the forecast using the ensemble machine learning model comprises,
training at least an average price model comprising a first Random Forest model and a regression model on the historical data and the plurality of previous promotions related to the product, wherein for each training, covariates of each model are varied;
determining a prediction of the promotion analytic using each of the average price model and the regression model;
determining a median value of the predictions as the forecasted promotion analytic; and,
outputting the forecasted promotion analytic to the user.

16. The system of claim 15 wherein, the average price model predicts an average effective discounted price of the promotion based on a category of products, and the regression model incorporates covariates to predict demand.

17. The system of claim 15 wherein, the regression model is a Ridge Regression model or a second Random Forest model.

18. The system of claim 17 wherein, the regression model is a second Random Forest model, the second Random Forest model comprising different covariates compared to the first Random Forest model.

19. A non-transitory computer-readable storage medium, the computer-readable storage medium including instructions that when executed by a computer, cause the computer to execute the steps of:
receiving historical data and a plurality of previous promotions related to a product;
receiving a first input parameter for a promotion from a user, the first input parameter comprising a macroscopic objective of the promotion or a constraint of the promotion;
passing the received input parameter through a machine learning model using a time series or regression based approach and determining using the machine learning model, a second input parameter that optimizes a forecast of a promotion analytic based on the first input parameter, the second input parameter comprising a causal factor;
forecasting the promotion analytic, based on the first and second input parameters, using an ensemble machine learning model, wherein forecasting using the ensemble machine learning model comprises,
training at least an average price model comprising a first Random Forest model and a regression model on the historical data and the plurality of previous promotions related to the product, wherein for each training, covariates of each model are varied;
determining a prediction of the promotion analytic using each of the average price model and the regression model;
determining a median value of the predictions as the forecasted promotion analytic; and,
outputting the forecasted promotion analytic to the user.

20. The non-transitory computer-readable storage medium of claim 19, wherein the average price model predicts an average effective discounted price of the promotion based on a category of products, and the regression model incorporates covariates to predict demand.

21. The non-transitory computer-readable storage medium of claim 19 wherein, the regression model is a Ridge Regression model or a second Random Forest model.

22. The non-transitory computer-readable storage medium of claim 21 wherein, the regression model is a second Random Forest model, the second Random Forest model comprising different covariates compared to the first Random Forest model.

* * * * *